No. 762,758. PATENTED JUNE 14, 1904.
L. B. POST.
PIPE COUPLING.
APPLICATION FILED OCT. 24, 1903.
NO MODEL.
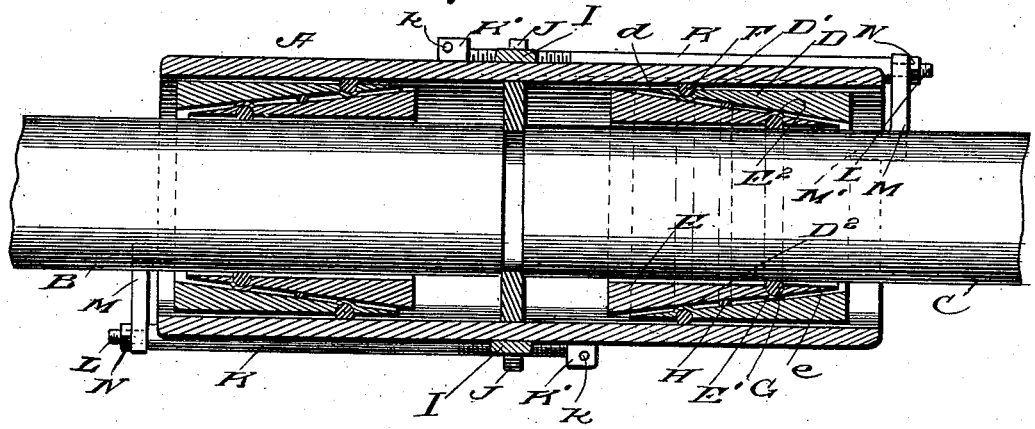
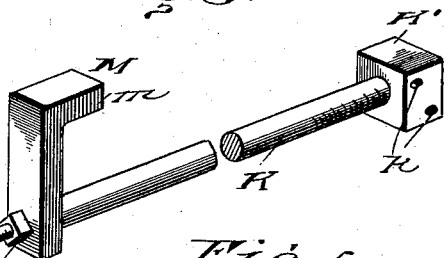
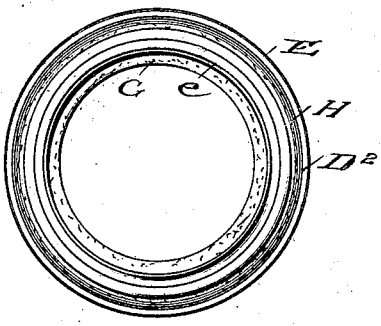
Inventor
L. B. Post,
By A. S. Pattison
Attorney No. 762,758.

Patented June 14, 1904.

UNITED STATES PATENT OFFICE.

LEWIS B. POST, OF BRADFORD, PENNSYLVANIA, ASSIGNOR OF ONE-HALF TO DOMINIC GUIDO, OF BRADFORD, PENNSYLVANIA.

PIPE-COUPLING.

SPECIFICATION forming part of Letters Patent No. 762,758, dated June 14, 1904.

Application filed October 24, 1903. Serial No. 178,444. (No model.)

*To all whom it may concern:*

Be it known that I, LEWIS B. POST, a citizen of the United States, residing at Bradford, in the county of McKean and State of Pennsylvania, have invented new and useful Improvements in Pipe-Couplings, of which the following is a specification.

My invention relates to improvements in pipe-couplings, and pertains more particularly to that class of detachable couplings.

The object of my invention is to provide a detachable pipe-coupling which is more simple, cheap, and durable than any heretofore produced and which is also more easily coupled.

In the accompanying drawings, Figure 1 is a vertical sectional view of my coupling, showing the pipes in position and locked therein. Fig. 2 is an end view of my detachable clamping member. Fig. 3 is a side elevation of one of the clamping-bolts. Fig. 4 is an end view of one of my wedges. Fig. 5 is an enlarged sectional view of one of the wedges, showing the packing in position before it is compressed.

Referring now to the drawings, A represents cylinder or sleeve, which is of a size considerably larger than the diameter of the pipe. The said pipes are represented by B and C, which are adapted to enter said cylinder or sleeve A, and their inner ends extend adjacent the center thereof.

Surrounding each pipe B and C within the cylinder or sleeve A are two wedges D and E. The said wedges, as shown in Fig. 4, are of a circular form and surround the pipes B and C. The said wedges being arranged on each pipe so that one will pass over the other, they are thus adapted to be wedged together and make a tight joint between the pipe and sleeve, thus preventing the leaking of liquid or air therefrom, for whichever the said pipes are adapted to be used. The outer face of the wedge D is provided adjacent the end $d$ with an annular recess D', which is adapted to receive the round gasket F, and the inner face of said wedge D, opposite the recess D', is provided with an inwardly-extending annular beading $D^2$, which forms a space between it and the opposite or other circular wedge E. The outer face of said wedge E, adjacent its rear end $e$, is provided with an annular gasket-recess E', which is adapted to receive the gasket G, and the inner face of said wedge E, opposite the recess E', is provided with an annular beading or ledge $E^2$, and thus it will be seen that the two wedges are simply placed upon the pipe with their ends extending in opposite directions, the outer wedge D passing over the inner wedge D'. Fitting between the two wedges is a packing H, which is of a form like that shown carried by the two wedges. While I have here shown the wedges provided with the flange or beading $D^2$ and $C^2$, I do not care to limit myself to the same, as the operation would be the same if I simply used the annular gasket-recess between the two wedges. It will be readily seen that by pressing or forcing the outer wedge D inwardly the smooth surface of the sleeve engages the gasket D' and compresses the same, while the same is being done with the gaskets E' and H, and after the same has been forced inward, as shown in Fig. 1, the same will retain said position and firmly hold the pipes within the sleeve. In order to more evenly press or force the said wedges D inwardly than can be done by hand or has been done by other devices, I provide a ring I, which is made in two sections and hinged together at $i$ and is adapted to fit around the sleeve A, and by making the same in two sections and bringing them together it is seen that the same can be readily removed and used in connecting up the pipes at different points along the line of pipes. The ends of the two sections of which said ring I is made opposite the pivotal point $i$ are bolted together and adapted to be drawn tightly together and clamped upon the sleeve at any desired point. The said ring is provided with any number of outwardly-extending ears J, which are provided with screw-threaded openings $j$, into which are adapted to screw the bolts K. The said bolts have the squared ends K', provided with openings $k$, adapted to receive an instrument for turning the same, and thus the bolts are moved within said openings. The opposite end of said bolts have a reduced rounded end L, which has its extreme outer end screw-threaded. Loosely fitting on said reduced portion of the bolts are the L-shaped members M and screwed upon the outer end of said reduced portion are the nuts N, which hold the member M thereon, yet allow the bolt to rotate within the same. The inwardly turned end $m$ of the L-shaped members M pass within the space between the pipe and the sleeve and engage the outer ends of the wedges D, and by means of the said bolts K the wedges are forced inwardly and the pipe is coupled together, and the device may be removed from the sleeve to be used on another coupling.

Having thus described my invention, what I claim as new, and desire to secure by Letters Patent, is—

1. A pipe-coupling comprising a sleeve adapted to receive the ends of the pipe, wedges within said sleeve, and circular gaskets adapted to be expanded between said wedges.

2. A pipe-coupling comprising a sleeve adapted to receive the ends of the pipe, circular wedges surrounding the pipes within the sleeve and gaskets adapted to be expanded between said wedges.

3. A pipe-coupling, comprising a sleeve adapted to receive the ends of the pipe, circular wedges surrounding the pipe within the sleeve, a gasket between said wedges, and a second gasket between the outer wedge and said sleeve.

4. A pipe-coupling, comprising a sleeve adapted to receive the ends of the pipe, circular wedges surrounding the pipe within the sleeve, a gasket between the wedges, a second gasket between the outer wedge and the sleeve, and a third gasket between the inner wedge and the pipe.

5. A pipe-coupling comprising a sleeve adapted to receive the ends of the pipe, circular wedges surrounding the pipes and overlapping each other, gaskets between said wedges and between said outer wedge and the sleeve and the inner wedge and the pipe.

6. A pipe-coupling comprising a sleeve adapted to receive the ends of the pipe, circular wedges surrounding the pipes and one wedge overlapping the other and extending in opposite directions, gaskets between said wedges and between the outer wedge and the sleeve and the inner wedge and the pipe.

7. A pipe-coupling comprising a sleeve adapted to receive the ends of the pipes, circular wedges surrounding the pipes within the sleeve and one wedge overlapping the other and extending in opposite directions, gaskets between said wedges and between the outer wedge and the sleeve and the inner wedge and the pipe, and means for forcing the outer wedge inwardly.

8. A pipe-coupling comprising a sleeve adapted to receive the ends of the pipe, wedges surrounding said pipe within the sleeve, a circular member adapted to be clamped to said sleeve, and having screw-threaded openings therein, bolts adapted to be screwed within said openings, and L-shaped members swiveled to the outer end of said bolts and adapted to enter the space between the pipe and the sleeve and engage said wedges.

9. A pipe-coupling comprising a sleeve adapted to receive the ends of the pipes, wedges between said pipes and sleeve, and having depressions therein forming ribs on the opposite sides, and gaskets within said depressions.

10. A pipe-coupling comprising a sleeve adapted to receive the ends of the pipes, wedges between said pipes and sleeve and overlapping each other, and said outer wedge having an inwardly-pressed depression forming a rib on the inside and the inner wedge having an outward depression forming a rib on the outside.

11. A pipe-coupling comprising a sleeve adapted to receive the ends of the pipe, circular wedges extending in opposite directions and overlapping each other and having gasket-receiving recesses in their inner and outer faces and gaskets adapted to be compressed within said recesses.

12. A pipe-coupling comprising a sleeve adapted to receive the ends of the pipes, circular wedges surrounding the pipes and extending in opposite directions and overlapping each other, and having gasket-receiving recesses in their inner and outer faces, gaskets adapted to fit within said recesses, a detachable ring carried by said sleeve and having screw-threaded openings therein, bolts screwed within said openings, L-shaped members swiveled on the ends of said bolts and adapted to enter the space between the pipes and the sleeve to engage the outer wedge and force the same inward.

13. A pipe-coupling, comprising a sleeve adapted to receive the ends of the pipes, circular wedges surrounding the pipes within the sleeve, a gasket between the wedges, a second gasket between the outer wedge and the sleeve, a third gasket between the inner wedge and the pipe, a detachable ring carried by said sleeve and having screw-threaded openings therein, bolts screwed within said openings, L-shaped members swiveled on the ends of said bolts, and adapted to enter the space between the pipes and the sleeve to engage the outer wedge, and force the same inward.

In testimony whereof I have hereunto set my hand in the presence of two subscribing witnesses.

LEWIS B. POST.

Witnesses:
EDWARD JIFKINS,
HERMAN H. NORTH.